April 14, 1942. L. M. PERSONS 2,279,504
TIME AND TEMPERATURE CONTROL FOR STOKERS
Filed May 13, 1937 4 Sheets-Sheet 1

INVENTOR:
LAWRENCE M. PERSONS,
BY Lawrence C. Kingsland
ATTORNEY.

April 14, 1942. L. M. PERSONS 2,279,504
TIME AND TEMPERATURE CONTROL FOR STOKERS
Filed May 13, 1937 4 Sheets-Sheet 4

INVENTOR:
LAWRENCE M. PERSONS
BY Lawrence Kingsland
ATTORNEY.

Patented Apr. 14, 1942

2,279,504

UNITED STATES PATENT OFFICE 2,279,504

TIME AND TEMPERATURE CONTROL FOR STOKERS

Lawrence M. Persons, St. Louis, Mo., assignor to Automatic Control Corporation, St. Louis, Mo., a corporation of Delaware Application May 13, 1937, Serial No. 142,401

7 Claims. (Cl. 236—46)

The present invention relates to a temperature system and suitable mechanism to effect its control. More specifically, the invention involves an adjustable space thermostat responsive to the temperatures of the space in which it is located, with a time control adjustment of its settings and an accessory control interoperated with it, together with a single electric clock mechanism outside the space thermostat casing for operating both the time control and the accessory control.

In the mechanism there is a time relay to energize a furnace motor at given intervals. There is also a room thermostat switch responsive to changes in the temperature of the room, in circuit with the switch of the relay aforementioned that, closing upon existence of certain temperature conditions in the room, operates the relay switch and energizes the furnace motor.

In systems of this nature where it has been desired to have time-controlled mechanism to alter the temperature of operation of the room thermostat during certain intervals, such as at night, the room thermostat has been equipped with either spring or electric motor operated clockworks. Spring-actuated clocks have disadvantages that are well-known. Electric clocks, when used in close juxtaposition to thermostats, inevitably generate enough heat to influence the thermostat and to destroy its accuracy.

In the present invention both of these difficulties have been overcome. The time relay in circuit with the furnace motor has an electric clock in it. Means are provided here in the nature of an electromagnet ratchet for operating the time mechanism of the room thermostat from this electric clock of the relay. The electromagnet in the room thermostat is caused to operate by a switch in the relay clock at given intervals relatively widely spaced. Consequently, the amount of heat generated within the room thermostat and casing is very small and is not enough to affect the thermostat. However, the mechanism is fully automatic and retains all the advantages of an electrical clock over a spring-actuated clock.

It is, therefore, an object of the invention to provide a fully automatic time mechanism for controlling a room thermostat, but of such design that it will not generate sufficient heat adversely to affect the thermostat.

More specifically it is an object of the invention to employ a remotely located electric time clock for actuating the time mechanism in the room thermostat.

It is a further object to provide responding mechanism in the room thermostat actuated by the remote clock and of such design as not to generate sufficient heat adversely to affect the thermostat.

It is a further object to provide a room thermostat having time-controlled means for shifting its operating values, which time-controlled means includes an electrical circuit adapted to be closed by a preset mechanism and for a predetermined length of time, and automatically to be opened at the end of such period of time.

It is a further object of the invention to provide a thermostat, the operating values of which are adapted to be shifted by a rotatable member, with a remote clock controlling a magnetic ratchet, which latter turns the rotating member, together with a switch periodically operated by the remote clock, for energizing the magnetic relay at given intervals.

It is a further object of the invention to provide a switch operated by the clock for closing the circuit to the magnetic relay for only a very brief time interval.

It is a further object of the invention to provide a room thermostat having an anticipating heater thereon, together with means operated by the clock aforesaid periodically to close the circuit to a furnace motor and during such periods of closing to energize said anticipating heater of said room thermostat, whereby to prevent closing of the room thermostat during such periodical operation of the furnace motor.

With these objects in view, together with such others as appear from the description to follow, reference is made to the drawings in which.

Reference will first be made to the room thermostat shown particularly in Figs. 1 to 7, inclusive. This room thermostat has a back member 20 to which its mechanism is attached and over which is secured a casing 21. The front of the casing has a dial-receiving opening 22 therein and a graduated opening 23 about which are graduations 24.

Within the casing is a thermostat switch similar to that disclosed in my copending application Serial No. 79,052, filed May 11, 1936. It includes a bracket 25 of S-shape secured to the back plate 20. An extension 26 projects vertically from the upper end of the bracket 25. A headed screw 27 (Fig. 6) is fixedly threaded into the extension 26. An arm 28 has secured thereto a sleeve 29 bearing about the shank of the screw 27. To this sleeve 29 is secured the inner convolution of a bimetal coil 30. A switch lever 31 is fastened to the outer convolution of this coil, projects downwardly, and has a contact point 32 and armature 33 adjacent its outer end.

An adjusting lever 35 is freely pivoted at 36 onto the arm 28. The lever 35 is tapered at one end 37, which end bears against a cam 38 fixed to a stud shaft 39 mounted upon the lower end of the S-shaped bracket 25. A convex spring element 40 is secured to one end of the shaft 39 and bears against the bracket 25 to urge the shaft inwardly. This spring 40 offers frictional resistance to rotation of the shaft whereby it will remain in set position. A handle 41 is secured to the other end of the shaft, the handle being attached to a disc 42 that has an arcuate projection 43 extending from its edge. The handle 41 is elongated and upstands from the disc 42. It acts as a pointer cooperating with the graduations 24. The arcuate extension 43 strikes a projection 45 turned up from the bracket 25 to limit the rotation of the handle 41 and the cam 38.

A spring 46 is looped at one end into the lever 35 and at its other end into an insulating element 47 that, in turn, is secured to an upstanding flange 48 on a bracket 49 fixed to the back plate 20. At its upper end the lever 35 has an adjustable screw 50 threaded through opposed ears 51 and engageable against a movable cam 52, the functions of which will be described hereinafter. The spring 46, therefore, maintains the lever 35 as far to the left in Fig. 4 as it is permitted to go by its contact at one end with the cam 52 and at the other end with the cam 38.

The contact 32 on the movable switch blade 31 is adapted to cooperate with a relatively fixed contact 55. The contact 55 is secured to one leg 56 of a U-shaped switch plate 57, the opposite end 58 of which is secured to a clamp plate 59. Between the clamp plate 59 and a corresponding clamp plate 60 is held a horse-shoe magnet 61, a screw 62 holding them together. The plate 60 is integral with an ear 63 parallel to it and spaced from it by a connecting portion 64. A screw 65 is threaded through the ear 63 and the clamp plate 60. It projects beneath a spring plate 66 held beneath the two legs of the U-shaped switch plate 57. The spring plate 66 is secured by the rivets that hold the switch plate 57 in place. As will be explained hereinafter, the armature 33 on the switch blade 31 operates into and out of the magnetic field of the magnet 61. The extent to which the armature can move into this field is determined by the distance the relatively fixed contact 55 extends outwardly toward the contact 32. Since the distance the armature moves into the field determines the speed of the snap action produced by the magnet, adjustment of the screw 65 controls this snap action, as will be apparent from the description to follow.

An electrical contact 68 is fastened to the back plate 20 and is in circuit with the connecting portion 64 to which is secured the clamping element 60. A spring element 69 is snapped in between the terminal 68 and the screw 65 so that this screw will be held in adjusted position. It may be held in adjusted position. It may be seen that this terminal 68 is, therefore, in circuit with the fixed contact 55.

Another terminal 70 extends through the back plate 20 and is in electrical communication with the S-shaped bracket 25. Thus, from the contact 70 the movable switch blade 31 may be energized.

A third terminal 71 alongside the terminal 68 is in electrical circuit with the bracket 49. Between the bracket 49 and the pivoted arm 28 there extends an anticipating resistance heater element 72. Thus, if a circuit is established between the switch blade 31 and the bracket 49, the heater 72 will be energized, and it is so located as to influence the bimetal coil 30.

Figures 1, 2, 3, 6:
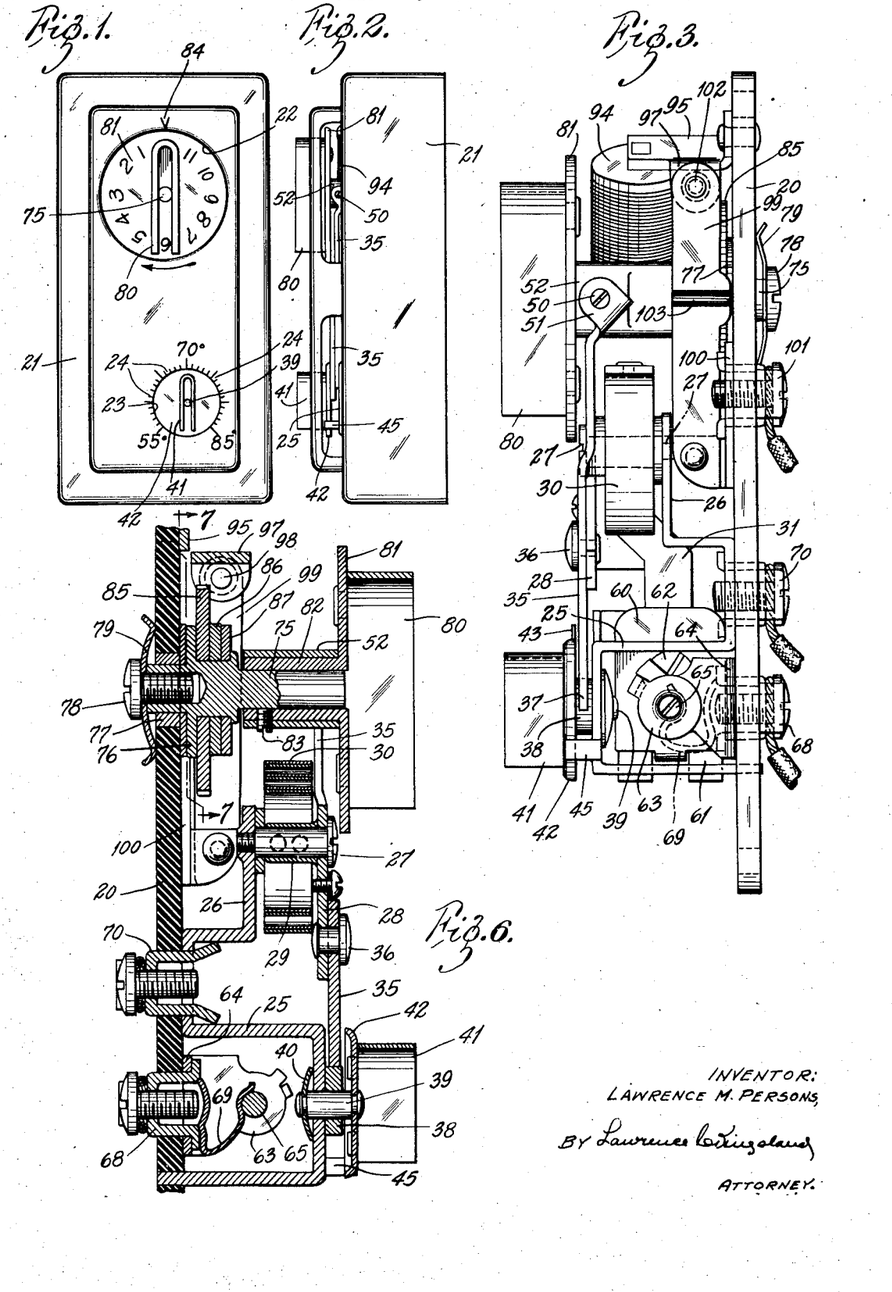
Fig. 1 is a front view of a room thermostat designed in accordance herewith.
Fig. 2 is a side elevation thereof.
Fig. 3 is a side elevation similar to Fig. 2 but with the casing removed.
Fig. 6 is a vertical section taken on the line 6—6 of Fig. 4.

As has previously been noted, the upper end of the lever 35 rests against a cam element 52. This cam element includes a shaft 75 journaled in the back plate 20. The shaft has a flange 76 that rotates in a flanged collar 77 in the back plate 20. The shaft is drilled and tapped to receive a headed screw 78, this screw holding a convex spring 79 against the back plate 20, whereby to urge the shaft and its attached elements backwardly to resist movement and to hold the shaft in adjusted position. A handle element 80 is secured to a graduated disc 81 that in turn has an integral sleeve portion 82, as seen in Fig. 6. The sleeve portion 82 fits over the outer end of the shaft 75. The cam proper 52, previously mentioned, comprises a band wrapped securely around the sleeve 82, and having one end upstanding therefrom to act as the cam face. The handle may be adjusted about the shaft 75 and secured in adjusted position by a set screw 83. The graduations on the disc 81 register with a pointer 84 on the casing 21.

A ratchet wheel 85 is supported on the shaft 75 for rotation therewith. To rotate the ratchet wheel, a plate 86 is rotatably mounted on the shaft between the ratchet wheel 85 and a washer 87. As is seen in Fig. 6, the shaft 75 is peened over to hold the washer in place.

The plate 86 has an arcuate extension thereon, which extension has an upstanding flange 88. The extension likewise has a ratchet dog 89 pivoted to it at 90 and urged into contact with the teeth of the ratchet wheel by a looped spring 91. A coil spring 92 secured to the flange 88 and to the terminal 49 urges the plate 86 and the ratchet dog 89 downwardly.

The flange 88 acts as an armature for an electromagnet 94. This magnet includes a coil and core supported on a bracket 95 fastened to the back plate 20. An angular projection 96 extends alongside the coil and acts as an additional stop for the armature 88.

The bracket 95 has an opposite extension 97 extending to the side of the ratchet wheel opposite the magnet and having a turned-down end upon which is situated a contact point 98. A movable switch blade 99 is attached to a fixed contact bracket 100 that has an upstanding flange to which the switch blade is attached. A terminal 101 leads from this bracket. The switch blade has at its free end a contact 102 cooperable with the fixed contact 98. Inwardly therefrom and adjacent the ratchet wheel the switch blade has a pressed-out lug 103. This lug is adapted to be engaged by a lifting cam 104 fixed to the ratchet wheel 85. This cam 104 is normally so located that the switch is opened when the indicator is in starting position, as shown in Fig. 1, at which time also the cam 52 is engaged beneath the screw 50 to shift the lever 35. It will be observed that upon energization of the magnet 94 the armature 88 is drawn upwardly until it strikes the magnetic core or the stop 96. This movement causes the dog 89 to drop back one tooth on the ratchet wheel 85. When the magnet is subsequently deenergized the spring 92 draws the plate downwardly and the ratchet dog advances the ratchet wheel the space of one tooth. The armature 88 has a projecting finger 105 extending through a slot 106 in the back plate 20. This finger limits the downward movement of the plate 86.

One end of the magnet coil is energized directly from the bracket 95 when the latter receives current through the closing of the contacts 102 and 98. The other end of the magnet coil is connected with a lead 107 that terminates at the flange 47 of the bracket 49 and hence at the terminal 71.

The remote means periodically to energize the magnet 94 is shown in Figs. 8 to 16. This mechanism includes a plate 110 to the back of which is fastened an electric clock mechanism 111 of any suitable kind and which, through proper reduction gearing, rotates a shaft 112 once every hour. It will be observed that this shaft projects through the plate 110. This rotating shaft has means to close at given intervals two switches that control certain circuits. On the plate 110 are terminals 113 and 114 to receive the line power. As shown in the wiring diagram of Fig. 17, the line current leads directly to a primary 115 of a transformer. In parallel with this primary is the clock motor 116 which, therefore, will run at all times that the line current is connected to the two terminals 113 and 114. Two terminals 117 and 118 are also provided for the leads from a furnace motor 119. This may be the stoker motor of a coal furnace or any similar piece of electrical equipment that may be energized to cause the particular type of furnace used to give off more heat. There is also provided a main switch 120 of the type described in my copending application Serial No. 88,714, filed July 3, 1936, now Patent 2,207,942, issued July 16, 1940. This switch 120 has two contacts 121 and 122 adapted to be brought together. The contact 122 is connected to the terminal 118 by a lead 123. The fixed terminal 121 is connected with the terminal 113 through one of the clock leads by a lead 124. It may be seen that the furnace motor is, therefore, connected across the terminals 113 and 114 through the switch 120 and will be energized whenever the switch 120 is closed.

As has been described in my copending application referred to, the switch 120 is of the thermal relay type actuated by a heater 125. When this heater is energized the switch 120 is closed.

The transformer has a secondary 126, one lead from which extends to a terminal 127. The opposite lead of the transformer extends to a point 128, from which point branches the heater 125, the other end of which is connected to a terminal 129. The second lead from the branch point 128 is a line 130 extending to a fixed contact 131 of a switch 132, the details of which will be given hereinafter. The movable contact 133 of this switch is connected to a lead 134 extending to a terminal 135.

From the terminal 129 there also extends a lead 136 to a fixed contact 137 of a switch 138, to be described in detail. This switch includes a movable contact 139 to which is connected a lead 140 extending to a terminal 141.

The two switches 132 and 138 are operated at given intervals by the clock mechanism 111. The switch 132 will now be described.

Mounted upon the time shaft 112 are cam discs 145 and 146. The disc 146 has integrally formed therewith oppositely extending collars 147 and 148. Through the collar 147 extend set screws 149 adapted to hold the cam discs against rotation relative to the shaft 112. The disc 145 fits about the collar 148 for rotation relative to the disc 146. A screw 150 fits through an arcuate slot 151 in the disc 146 and is threaded into the disc 145. Thus, the two cam discs have limited rotary adjustment one relative to the other, as defined by the length of the slot 151. The disc 146 has two opposite V-shaped notches 152 and 153. The disc 145 has identical oppositely spaced V-notches 154 and 155. Additionally, the disc 145 has the notch 156 and the disc 146 has the notch 157. Consequently, with the two discs in the relative positions shown in Fig. 12, the notches 152 and 154, and 155 and 153, coincide. There will then be two opposing notches on the cam. If, however, the disc 145 be rotated relative to the disc 146 until the screw 150 engages the opposite end of its slot, the notch 155 will coincide with the notch 157, but all of the other notches will be opposite arcuate spaces. Consequently, there will be only one notch presented per revolution. Hence, by shifting the relative positions of the discs 145 and 146 the cam element may be made to present either one or two equally spaced V-notches per revolution.

The switch 138 includes the relatively fixed contact 137 and the relatively movable contact 139. Both of these contacts are fixed to a bracket 160 that has a flange 161 extending down parallel with the switch blades. As described in my copending application referred to, a screw 162 having a head engageable with a blade 163 of the fixed contact is threaded into a collar on the flange 161. An adjusting wheel 164 is fastened to the screw for rotation therewith. The screw 162 passes through an opening in a blade 165 holding the movable contact, so as not to touch the same. By this means rotation of the wheel 164 causes the fixed contact 137 to be adjusted toward or away from the movable contact 139.

Figure 10:
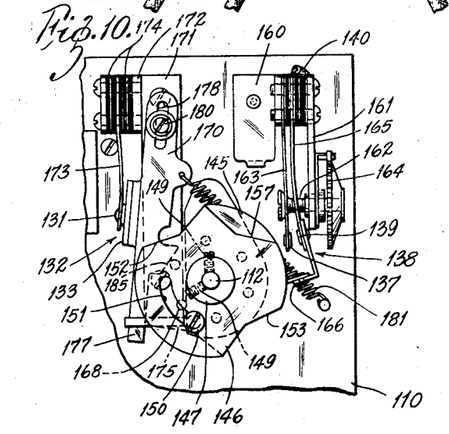
Fig. 10 is a view of the clock cam showing its operation on the two switches.
Figure 11:
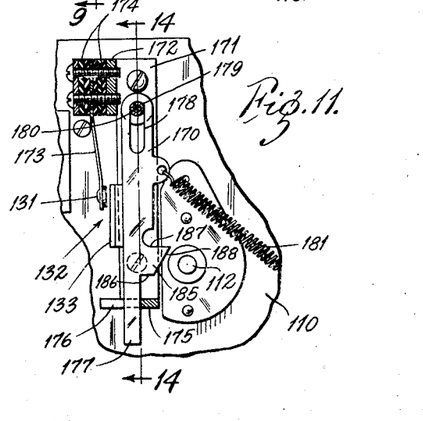
Fig. 11 is a sectional view looking at the front of Fig. 10 taken immediately below the clock cam.
Figures 12, 13:
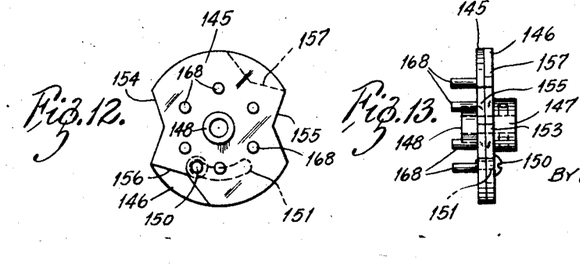
Fig. 12 is a view from the backside of the clock cam.
Fig. 13 is an edge view thereof.
Figure 14:
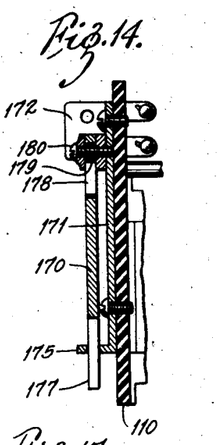
Fig. 14 is a section on the line 14—14 of Fig. 11.
Figures 15, 16:
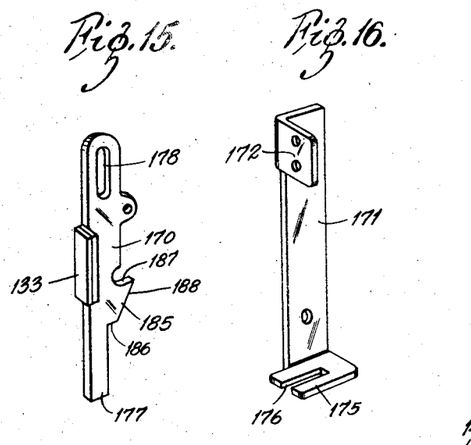
Fig. 15 is a perspective view of the movable time switch bar.
Fig. 16 is a perspective view of the fixed switch bracket.

The blade 165 has a turned-down end 166 thereon that constitutes a follower engageable with the cam discs. The inherent resiliency of the spring blade maintains this follower in contact with the cam discs. As shown in Fig. 10, whenever the cam follower is on an arcuate part of the discs, the switch is maintained open. When, however, a notch is presented to the follower, the switch can close. The distance radially inwardly toward the shaft 112 that the follower 166 and consequently the contact 139 must move before the switch is closed is determined by the position of the adjusting wheel 164. Since the notch is V-shaped, this adjustment likewise determines the length of the period of time during which the switch is closed. Such is described in my copending application referred to.

The disc 145 is provided with a series of equally spaced pins 168 extending from its inner face and arranged circularly. The switch 132 is provided with a movable contact 133 somewhat extenuated. This contact is formed on a bar 170. This bar is subject to a combined pivotal and translatory movement. It is mounted over a second bar 171 rigidly secured to the plate 110. The bar 171 has an upstanding flange 172 to which is secured the relatively fixed switch blade 173, there being insulation 174 preventing electrical contact between them. The contact 131 is mounted on this blade 173. The bar 171 likewise has a flange 175 having an open ended slot 176 into which the end 177 of the first bar 170 is adapted to fit and by which the same is guided. The bar 170 is provided with a slot 178 engageable around a collar 179 secured to the second bar 171 by a screw 180. The arm 170 may thus pivot about the screw 180 and also may reciprocate relative thereto within the limits permitted by the slot 178. A coil spring 181 fixed to the plate 110 at one end and to the bar 170 at its other end urges the bar toward the closed end of the slot 176 with a relatively light force. It likewise urges the bar 170 downwardly as far as possible likewise with a relatively light force.

Figures 8, 9:
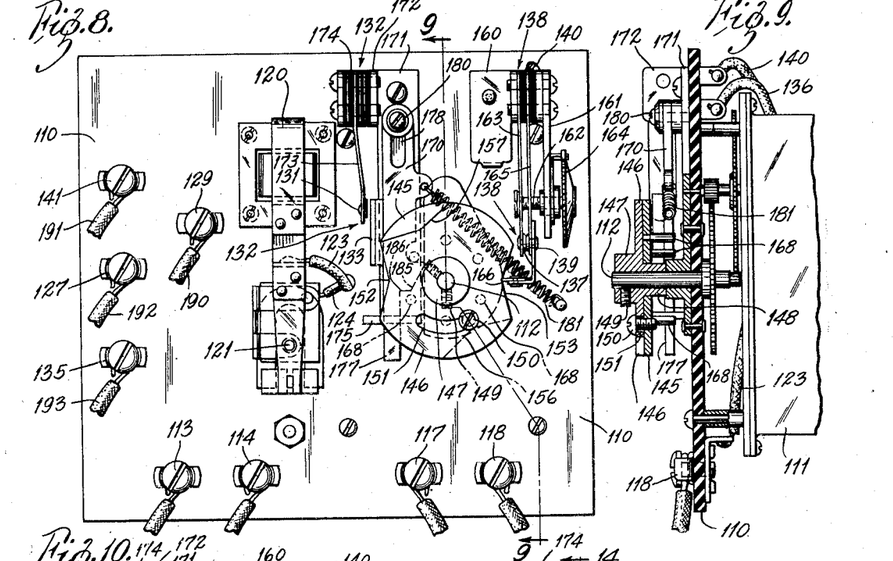
Fig. 8 is a front elevation of the remote clock and relay used with the room thermostat of the previous figures.
Fig. 9 is a section on the line 9—9 of Fig. 8.

The bar 170 has medially thereof a projection 185. This projection has a lower shoulder 186 and an upper shoulder 187 connected by a sloping edge 188. The two shoulders 186 and 187 are spaced apart by slightly less than the linear distance between successive pins 168. In the position of Fig. 8 the first bar 170 is in its innermost position wherein the projection 185 is located between two such pins 168. As the cam disc 145 rotates clockwise, a pin 168 will engage against the shoulder 186, lifting the bar 170 substantially vertically. In this movement the contacts 133 and 131 are separate. When, however, after suitable rotating movement, the pin 168 begins to remove itself from the shoulder 186, it will slide under the sloping face 188. The spring 181, aided by gravity, will then draw the bar 170 downwardly while maintaining it to the right, in Fig. 8, as far as possible. The sloping face, however, displaces the lower end of the bar to the left, causing the contact 133 to wipe over the contact 131, as illustrated in Fig. 10. When the bar travels sufficiently far so that the shoulder 187 can drop beneath the pin 168, the spring 181 will draw the bar 170 back to the starting position of Fig. 8, again opening the contact. Thus, it may be seen that the contacts of the switch 132 are closed only for a very short period of time. In accordance with the number of pins shown, the switch 132 will close six times during the hour and the duration of each closing period may be in the neighborhood of one-twentieth of a second. It is desirable that the switch be mounted so that the rod 170 will fall partially by gravity and partially by spring action. If it operates solely by gravity, the contacts are apt to be closed for too long a period; whereas, if spring action is relied entirely upon, the period is apt to be too short.

Thus, it may be seen that the clock mechanism 111 closes the switch 132 six times during an hour and closes the switch 138 one or two times during the hour. Of course, it will be understood that the number of rotations of the shaft 112 per hour may be varied, as may the number of pins used, or the design of slots.

In connecting the two mechanisms described together the terminal 68 is connected to the terminal 129 by the line 190. The terminal 70 is connected with the terminal 141 by the line 191. The terminal 71 is connected to the terminal 127 by the line 192; and the terminal 101 is connected to the terminal 135 by the line 193.

Figure 4:
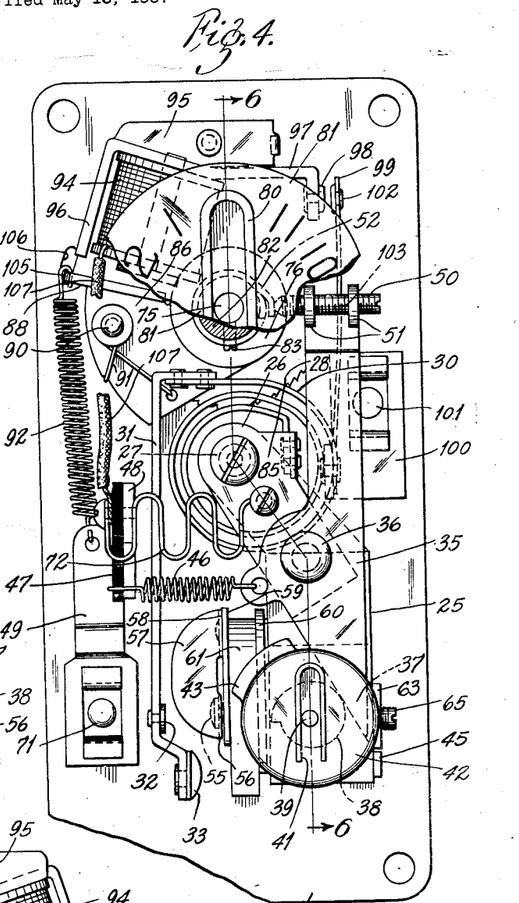
Fig. 4 is a front view with the casing removed, some parts being broken away.
Figure 5:
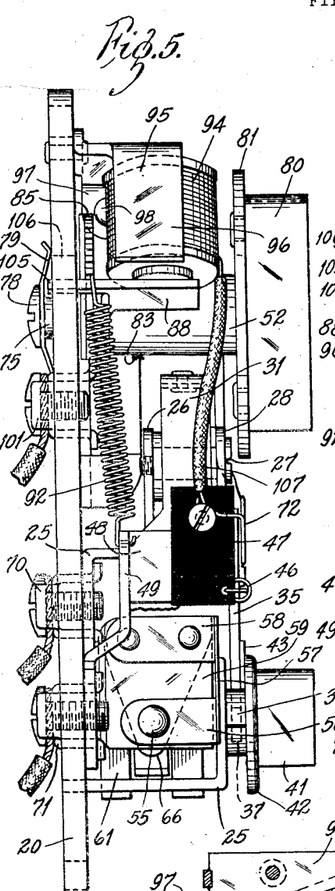
Fig. 5 is a side elevation with casing removed taken from the side opposite that shown in Fig. 3, and which is the left side of Fig. 4.

The operation of the mechanism is as follows:
The operation of the room thermostat switch by the bi-metal coil 30 is as follows:

As the ambient temperature cools the bimetal, the switch blade 31 will be moved to the right in Fig. 4 (left in Fig. 17) until the contact 32 thereon meets the fixed contact 55. Needless to say, the snap-action mechanism hastens the last part of this movement. The preliminary or starting position of the switch blade 31 for any particular temperature is determined by the position of the inner convolution of the bimetal coil 30 and hence by the relative angular position of the arm 28 to which this inner convolution is attached. If, for instance, a drop of 5° in temperature is sufficient to close the switch from the position of Fig. 4, and if the arm 28 be pivoted in a counterclockwise direction, the contact 32 will be moved initially closer to the contact 55 so that a drop in temperature of some lesser amount such as 2° will become sufficient to close the switch.

So the position of the arm 28 controls the temperature at which the switch will close. The position of this arm, in turn, is controlled by the position of the lever 35. The lever 35 is shifted by two independent means. The first is the cam 38 operated by the handle 41. As this cam is rotated clockwise from the position in the drawings to some position such as 75°, the lower end of the lever 35 will be moved outwardly while the upper end acts as a pivot for such motion. Such movement of the lever 35 produces a counterclockwise shifting of the arm 28. Hence, the initial position of the switch blade 31 is shifted closer to the contact 55. If it be assumed that the ambient temperature is 78°, for the position shown in the drawings, a drop of 8° would be necessary to close the switch; but, if the handle 41 be moved as suggested, a drop of 3° would be sufficient to close the switch.

The time mechanism operates as follows:
In the position shown the thermostat is set for its higher operating value, which may be referred to as the daytime value. When it is desired to have the furnace operate at a lower value for a certain period of time, the handle 80 is turned from the position of Fig. 1 counterclockwise until a numeral on the dial 81 corresponding to the number of hours that it is desired to have the furnace operate at this lower value registers with the index 84. Thus, if the time is 11:00 o'clock p. m. and it is desired to have the furnace come back to daytime value at 6:00 a. m., the handle 80 will be turned until numeral 7 of the dial registers with the index 84, since from 11:00 o'clock p. m. until 6:00 a. m. is seven hours.

As soon as the handle is turned, the cam 52 is withdrawn from beneath the screw 50. This permits the lever 35 to move to the left under the influence of the spring 46, it pivoting about the contact of its lower end with the cam 38. This shifts the arm 28 clockwise and consequently removes the contact 32 further from the contact 55. Hence, a greater drop of temperature is necessary before the switch will close. It correspondingly will open at a lower temperature.

If it be assumed that the magnet 94 will be energized intermittently, this energization will draw the armature 88 upwardly against the action of the spring 92 a distance just sufficient to cause the dog 89 to be moved backwardly the space of one tooth. Then, upon deenergization of the magnet, the spring 92 draws the armature down and the dog 89 advances the ratchet wheel this distance of one tooth until the armature is stopped by engagement of the finger 105 with the lower end of the slot 106. In the upward movement of the armature, the ratchet wheel is prevented from following because of the friction produced by the spring 105 acting against the back of the plate 20.

Figure 7:
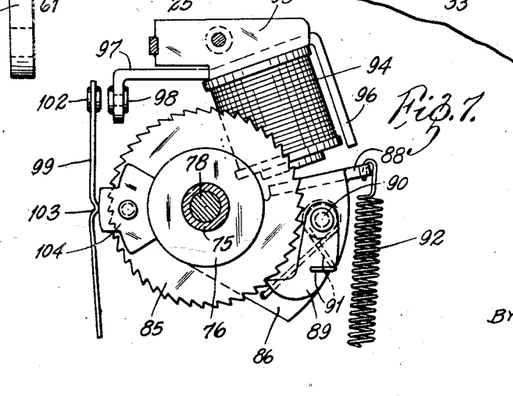
Fig. 7 is a vertical section looking forwardly taken on the line 7—7 of Fig. 6 and showing the magnetic ratchet mechanism.

The energization of the magnet 94 is controlled by the switch blade 99. In the position of Figs. 4 and 7 the contacts 102 and 98 are parted by action of the cam 104 on the switch blade. As soon, however, as the handle 80 is turned, the cam 104 is withdrawn and the switch closes, permitting the magnet to be energized.

The ratchet wheel will be thus turned one tooth at a time for a given length of time until the handle 80 is brought back up to registration with the index 84. Shortly prior to this time, perhaps beginning two hours before the time occurs, the gradual slope of the cam 52 will begin to move the screw 50 gradually to raise the position of operation of the thermostat. When the handle is in the vertical position, the cam 52 will be fully under the screw 50. At the same time the cam 104 will come under the pressure lug 103 to open the switch contacts 102 and 98 to prevent further energization of the magnet 94. The thermostat, therefore, will remain in this position until further manual adjustment is given to it, either by shifting of the handle 39, or shifting of the handle 80.

The gradual slope of the cam 52 acting over a substantial period of time prevents overriding of the furnace, as has been described in my copending application referred to. An initial adjustment of the mechanism to calibrate the same against a standard may be effected by turning the screw 50.

The action of the magnet 61 on the armature 33, in addition to the snap-action effect, gives the switch a differential. In other words, the value or temperature at which the switch closes is slightly different from that at which it opens. This is susceptible of adjustment by the screw 65, as will be understood.

In connection with this differential mechanism, the anticipating heater 72 is employed. If it be assumed that the differential is 3°, this anticipating heater will be designed to produce a heat equal to slightly less than this differential. The heater is caused to operate whenever the thermostat switch is closed, since an inspection of the wiring diagram shows that the heater is in series with the thermostat switch.

If, therefore, the switch is designed to open at 73° but not to close until the temperature drops to 70°, the anticipating heater may produce a quantity of heat equal to a change in ambient temperature of 1½°. Therefore, when the switch closes upon drop of temperature to 70°, the anticipating heater will come on. As the temperature rises to 71½°, which it will do over a period of time, the switch will be opened in advance of its normal differential setting of 73°. But, since the heating plant requires a certain period of time before it settles down after its cut-off, it will continue to produce heat. The provision of the anticipating heater, therefore, takes off of this characteristic of heating plants and cuts off the active operation of the plant sufficiently in advance so that the heat produced after the cut-off is just the proper amount to bring the room up to its proper temperature of 73°. Once the switch opens, however, the temperature must drop the full differential value to 70° before the switch again closes. It is, of course, obvious that the value of this resistance here will depend upon the particular system being used.

If the magnet 94 is energized only six times an hour and then for just a fraction of a second, the amount of heat generated within the thermostat casing is so small that it has no adverse effect upon the bimetal. Furthermore, this magnet structure requires little space so that the room thermostat can be made small and compact.

The present system, while attaining the above desirable characteristics, does so without increasing the mechanism necessary, since it employs the use of a time mechanism already in the system for periodically energizing the magnet 94. Of course, it will be understood that additional time mechanism could be employed, but only at the sacrifice of economy.

The energizing means consisting of the structure mounted upon the plate 110 operates as follows:

The cam discs 145 and 146, being duly adjusted to give the proper number of notches, are rotated by the clock motor 116. This motor 116, of course, is merely any constant speed motor. If the disc 145 rotates one revolution an hour, the switch 132 will close six times an hour. This switch is put in series with the magnet 94 through the switch blade 99. The ratchet wheel 85, therefore, would be given seventy-two teeth.

As will be understood, the switch 138 closes once or twice per hour. The operating heater 125 is in series with this switch 138 so that, when the switch closes, the heater 125 energizes and, acting upon the bimetal of the switch 120, closes the contacts 121 and 122 to put the furnace motor into circuit.

It is desirable to have the room thermostat rendered inoperative when the time relay switch 138 is closed. Since a certain period of time is necessary before the effects of turning on the furnace are felt upon the room thermostat, the time relay might cause operation of the furnace motor; but, before the room could heat, the room thermostat might close. This is prevented by connecting the anticipating heater 72 in series with the switch 138. Hence, whenever the switch 138 is closed, the anticipating heater is energized. Should the room at this time be cooling down to 70° so that the room thermostat is on the verge of closing, heating of the heater 72 produces a temperature at the bimetal 30 of 71½°, which is sufficient to prevent closing of the switch. The amount of heat provided by the periodic automatic refueling of the furnace will take effect in the room before the thermostat 30 will have again cooled down to 70° after the switch 138 is opened by the clock mechanism.

Figure 17:
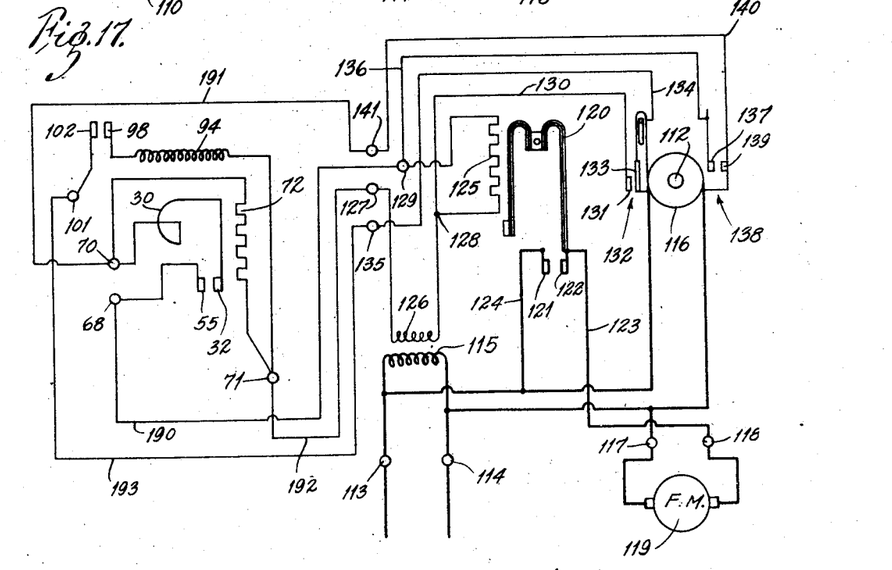
Fig. 17 is a wiring diagram of the mechanism.

Fig. 17 discloses how the above takes place. With power connected to the terminals 113 and 114, the primary 115 of the transformer and the clock motor 116 are immediately energized, they being in parallel across the terminals. With the switch 120 open, the furnace motor 119 will remain off. Should the room thermostat 30 cool to close the contacts 32 and 55, circuit will be established as follows, beginning with the terminal 127 of the secondary 126: From terminal 127 of the secondary 126 through line 192 to terminal 71 of the thermostat; thence through anticipating heater 72 to terminal 70, through the bimetal 30 to contact 32, contact 55, terminal 68, line 190, terminal 129, relay heater 125, branch 128, and back into the secondary 126. Energization of the heater 125, acting upon the bimetal of the switch 120, closes the contacts 121 and 122 and puts the furnace motor across the terminals 113 and 114. The furnace motor, therefore, will produce heat that ultimately will raise the temperature in the room to a value which, coupled with the temperature produced by the anticipating heater 72, will open contacts 32 and 55, whereupon the heater 125 will be deenergized. The furnace being hot, however, the temperature in the room will continue to rise until it reaches the value equal to the opening value of the thermostat, plus the value of the anticipating heater. It will not, however, override this value, since the heater 72 is designed to be just enough to balance the surplus heat of the furnace at the time of cut-off and prevent such overriding.

When the clock motor 116 operating on the shaft 112 closes the switch 138, circuit from the secondary 126 is as follows: Terminal 127, line 192, terminal 71, anticipating heater 72, terminal 70, line 191, terminal 141, line 140, contact 139, contact 137, line 136, terminal 129, heater 125, branch 128, and back into secondary 126. As before, energizing of the heater 125 cuts the furnace motor 119 in circuit. The anticipating heater 72 will prevent closing of the room thermostat.

After the handle 80 has been rotated, the clock motor periodically will close the switch 132 to energize the magnet 94 so long as the contacts 98 and 102 are closed. If it be assumed that the latter contacts are closed, at the time that the switch 132 closes, circuit is as follows: From the terminal 127 by line 192 to the terminal 71, through the magnet 94, contact 98, contact 102, to the terminal 101, line 193, terminal 135, line 134, contact 133, contact 131, line 130, branch 128, and back into the secondary 126. This circuit will be seen to be in parallel with the relay heater 125 and is entirely dependent upon the position of the switch contact 102, as determined by the position of the ratchet wheel. As soon as the ratchet wheel 85 is returned to starting position, the cam 104 will open the contacts 98 and 102 to take the magnet 94 out of circuit, and thereby to stop further movement of the wheel.

It will be seen from the foregoing that a mechanism has been provided that will attain the objectives set forth.

What is claimed is:

1. In a mechanism of the kind described, a thermal switch, and mechanism mechanically to shift the switch independently of the temperature, said mechanism including a cam, means to rotate the cam, said means including a ratchet wheel and a ratchet dog to rotate the same, an electromagnet to shift the ratchet dog whereby the wheel may be advanced, a circuit for said electromagnet, a switch in said circuit, and means operated by said ratchet wheel to open the last-named switch at a predetermined time.

2. In a mechanism of the kind described, a thermal switch and means mechanically to shift the switch independently of the temperature, said means including a shaft, manual means to rotate the shaft a predetermined distance around from a starting position, a first cam operated by the shaft and means operated by the cam to shift the switch, a second cam operated by the shaft, an electro-magnetically-operated ratchet adapted to shift the shaft, a circuit for the electromagnet, a switch in said circuit, said second cam maintaining said switch open when the shaft is in starting position, so that upon advance of the shaft the electromagnet switch will be closed until the shaft is returned to starting position, and then will be opened.

3. A control mechanism for temperature-influencing devices, including a main switch in circuit with the temperature-influencing device, electrical means to operate the main switch, a thermal switch in circuit with said electrical means, a clockworks, a first switch operated by said clockworks, a circuit including said first clockworks switch and said electrical means, whereby when the first clockworks switch is closed the temperature-influencing means will be put in circuit, means also put in circuit upon closing of the first clockworks switch to retard operation of the thermal switch, means to shift the temperature of operation of the thermal switch including an electrical device, a circuit therefor, and a second switch operated by said clockworks to control the circuit through the electrical device.

4. In combination, a furnace mechanism, a control circuit for said furnace mechanism including a main switch, electrical means to close the main switch, a room thermostat, a circuit through said thermostat and said electrical means to close the main switch when the room temperature drops to a predetermined value and cause said furnace mechanism to produce additional heat, electrically-operated means to shift the room thermostat to alter its operating value including a rotatable member movable a given angular distance from starting position and electric mechanism to return it to starting position, a cam on said rotatable member, an element adapted to be shifted by the cam when the same is in starting position to move the thermostat, clockworks, a first switch operated by the clockworks, a circuit through said first switch and said electrical means to close the main switch at given time intervals, a second switch operated by the clockworks, a circuit through said second switch and said electrical mechanism means to shift the room thermostat, whereby said shifting means is operated from the clockworks, and means in circuit with the first clockworks switch to retard closing of the room thermostat during operation of the furnace mechanism by the circuit through the first clockworks switch.

5. In combination, an electrically-operated furnace mechanism, a circuit therefor, a main switch in the circuit, an electrical clockworks, a room thermostat switch operable to close the main switch upon occurrence in the room of a predetermined heat value, means to change said value including a movable member, electrical means to move said member, means operated by the clockworks to cause energization of said moving means, and means automatically to cause de-energization of said moving means after a determined period of movement of said member.

6. In combination, an electrically-operated heat change mechanism, a circuit therefor, a main switch in the circuit, a room thermostat switch closable to cause said main switch to close, an anticipating heater in circuit with the room thermostat to be energized upon closing thereof and to produce a biasing heat acting upon said thermostat to produce a tendency in the same toward opening position, clockworks, a circuit controlled by the clockworks to cause the main switch to close at given intervals, said circuit also including said anticipating heater whereby the room thermostat will be retarded from closing during and after operation of the heat change mechanism by the clockworks.

7. In combination, a furnace, a first control circuit for said mechanism including a main switch; electrical means to close the main switch; a clockworks, two switches operated by the clockworks; an adjustable room thermostat, the room thermostat being entirely separated from the clockworks; a second circuit through said electrical means on the main switch and room thermostat to close the main switch upon shifting of the room thermostat in response to changes in temperature, whereby to operate the furnace mechanism; manual means to adjust the room thermostat to vary the temperature of operation, separate electrically operated means to alter the temperature of operation from its normal value including a rotatable member movable a given angular distance from starting position and a dog and ratchet to return it to starting position, with an electromagnet for moving the dog and a spring for returning the same, a first cam on said rotatable member, an element adapted to be shifted by the cam when the rotatable member is in starting position to shift the thermostat; a third circuit through the first clockworks switch and the electrical means to close the main switch, said switch and circuit being closed by the clockworks at given intervals; a fourth circuit through the second clockworks switch and said electromagnet, said second switch being closed periodically for instantaneous intervals whereby said magnet may shift the rotatable member; a second cam on the rotatable member and a switch adapted to be opened thereby when said member reaches starting position, said switch being in the fourth circuit whereby to stop rotation of the angular member upon its return to initial position, at which position the first cam on the rotatable member has returned the room thermostat to its normal operating value.

LAWRENCE M. PERSONS.